United States Patent [19]

Flynn

[11] Patent Number: 4,984,192
[45] Date of Patent: Jan. 8, 1991

[54] PROGRAMMABLE STATE MACHINES CONNECTABLE IN A RECONFIGURATION SWITCHING NETWORK FOR PERFORMING REAL-TIME DATA PROCESSING

[75] Inventor: Jeffrey C. Flynn, Irvine, Calif.

[73] Assignee: Ultrasystems Defense Inc., Irvine, Calif.

[21] Appl. No.: 279,440

[22] Filed: Dec. 2, 1988

[51] Int. Cl.⁵ .............................................. G06F 15/16
[52] U.S. Cl. .................................... 364/900; 364/931;
364/931.1; 364/949.3; 364/949.4
[58] Field of Search ............................ 364/200, 900

[56] References Cited

U.S. PATENT DOCUMENTS

| | | | |
|---|---|---|---|
| 4,321,692 | 3/1982 | Quadri | 365/15 |
| 4,389,677 | 6/1983 | Rushby et al. | 358/280 |
| 4,439,839 | 3/1984 | kneib et al. | 364/900 |
| 4,534,040 | 8/1985 | Thapar | 375/39 |
| 4,583,196 | 4/1986 | Koo | 364/900 |
| 4,622,585 | 11/1986 | Reitsma | 358/135 |
| 4,675,556 | 6/1987 | Bazes | 307/465 |
| 4,706,216 | 11/1987 | Carter | 365/94 |
| 4,720,780 | 1/1988 | Dolecek | 364/200 |
| 4,740,891 | 4/1988 | Kirkpatrick | 364/200 |
| 4,742,252 | 5/1988 | Agrawal | 307/465 |

Primary Examiner—Raulfe B. Zache
Attorney, Agent, or Firm—Knobbe, Martens, Olson & Bear

[57] ABSTRACT

A programmable element (PE) for implementing programmable logic circuits includes a run address register, a load address register and a random access memory (RAM). The RAM is initialized with a state transition table using the load address register. After RAM initialization, and at each clock transition, the run address register is loaded with external inputs and a present state. The present state is received as the next state output of the RAM from internal feedback lines from the RAM output to the run address register inputs. The RAM output is divided into a next state which is stored in the internal feedback lines and element data outputs to an destination external to the programmable element. A state processor (SP) for implementing complex programmable logic circuits includes a plurality of programmable elements and a matrix switch. The matrix switch provides external feedback for programmable elements. In addition, any programmable output may be routed to any programmable element input. A hierarchical network of state processors for implementing programmable logic systems includes a plurality of state processors and a plurality of matrix switches. Within the hierarchical network any state processor input can receive any state processor output.

13 Claims, 10 Drawing Sheets

PROGRAMMABLE STATE MACHINES CONNECTABLE IN A RECONFIGURATION SWITCHING NETWORK FOR PERFORMING REAL-TIME DATA PROCESSING

BACKGROUND OF THE INVENTION

1. Field of the Invention

The present invention generally relates to programmable state machines, and switching networks comprising a plurality of these programmable state machines. More particularly, the present invention is concerned with programmable elements having random access memory (RAM), address inputs, data outputs and feedback paths, and state processors which use matrix switches to network any number of these programmable elements.

2. Description of the Prior Art

The behavior of sequential digital circuits is governed by the inputs to the circuit, and the state of the flip-flops in the circuit at a time T, also known as the present state. From this information the circuit defines a next state at time T+1, where the transition from time T to time T+1 is determined by a common clock source. In some circuits the outputs contribute to the inputs via feedback paths. Therefore, the next state of the circuit is dependent upon the outputs of the circuit at time T as well.

Sequential circuits are generally known as state machines since the order of processing in the circuit can be represented as a state diagram. State machines can perform many useful functions. Indeed, all digital computers are some form of a state machine. However, most computers are not "pure" state machines because they have many features which provide side effects, for example, stacks, interrupts, caches, memory paging, and so on.

Among the classes of processing handled by digital computers is a class known as real-time processing. Real-time data is data which must be processed within some finite processing time $T_f$. Data not processed within the time bounded by $T_f$ is lost and generally is not recoverable. It is not difficult to see that these time critical processing tasks become more difficult as $T_f$ tends toward zero. Therefore, in real-time systems, as the data input rate increases, all other factors being equal, the burden on computational resources increases to satisfy the fixed time constraint $T_f$.

Digital communication systems are characterized by the input, output and real-time processing of high-speed data channels, typically receiving megabits of data per second and many modern systems approaching gigabit throughputs. Digital communication is employed because of its well known capacity to overcome problems associated with noisy environments and attenuation. However, digital communication algorithms are computationally intensive and only exacerbate the problem of processing digital data in real-time.

A basic communication channel has one transmitter and one receiver. On the transmitting side of a communication channel, typical functional components of digital transmitters which handle these data include: coders, to encode digital data streams; randomizers (or scramblers) to randomize periodic data; railers, to distribute channels across frequency phase angles such as quadrature phase shift keying (QPSK) modulators; multiplexers, to combine multiple data channels into a single time division multiplexed (TDM) physical channel; and justifiers, to control justification bits which allow synchronization between data channels clocked at various frequencies. A receiver for the same communication channel performs the inverse, or $D^5$ (decoding, derandomizing, derailing, demultiplexing and dejustification), operations of those functions described above. The digital hardware components which implement these functions are usually designed with sequential circuitry. Oftentimes these circuits are customized for a particular application.

Many communications applications, however, require reconfigurable functional components to satisfy a broad range of operational modes. General purpose computers provide the requisite flexibility for these applications since software can be easily changed to emulate new functions. Nonetheless, such a digital processing capability is not fast enough for real-time processing. On the other hand, fast custom digital circuitry for a reconfigurable system is generally too costly. If implemented in custom circuitry, the vast number of functional configurations and parameter combinations of many nonhomogeneous operational modes quickly becomes a combinatorial explosion of digital circuitry.

Even when the cost of custom circuitry is not prohibitive, the loss of time in fielding state of the art semiconductor processes is a critical shortcoming of complex digital circuitry. Wafer scale technology is providing digital designers undreamed of power in designing functions requiring complex circuitry. Submicron features found on modern wafers lead to extremely dense circuitry, which is therefore lighter and more portable, and faster, since data paths are shortened. The future will bear further increases in circuitry functions as other denser semiconductor processes are discovered.

However, with each new process comes lost time in laying out the existing circuit on a new wafer. The layout requires either a massive, existing library of standard cells, found in silicon compilers, or a tedious and laborious translation from one process to the next. In addition, the new circuit must be retested and this retest is time consuming. Thus, if the smallest and fastest technology is desired to replace a preexisting fielded design, much time is wasted in translating complex circuitry from the old process to the new one.

These problems could be resolved by, instead of designing with complex circuitry, using a large number of simple programmable elements to process in parallel each functional stage of a receiver input. This processing technique is called pipelining and it has been found to be effective in other real-time applications. As a by-product of using many identical components the system becomes redundant, one processor can take over the function of any other. Thus, design efforts can be minimized, and failures in manufacture or operation can be overcome leading to a highly fault tolerant system.

Although tightly-coupled networks of simple programmable elements have been successfully used in the past for other real-time applications, there are many deficiencies with these networks for use in the currently envisioned application. Most of these networks have limited feedback paths and provide no mechanism for adding additional paths to provide external feedback. In addition, many existing state machine networks are designed with combinational "glue" logic to join together several levels of sequential logic. Furthermore, the switching networks in present applications are typically fixed architecture, being for example, strictly hierarchical, pipeline, array processor or otherwise.

Consequently, a need exists for a programmable, highly reconfigurable, modular, fault tolerant, simple and regular hardware device that can be used to perform real-time communication functions. Such a device should allow a number of feedback paths for state machine processing, minimize levels of circuitry to remove delays, and provide multiple paths between programmable elements for flexible data broadcasting, pipelining, and other parallel architectures.

SUMMARY OF THE INVENTION

The present invention provides a programmable state machine and switching network designed to satisfy the aforementioned needs. The subject invention comprises a programmable element (PE), which is a programmable state machine, and a fast, flexible network of programmable elements called the state processor (SP). The SP network is reconfigured by controlling a matrix switch which can route any output of any programmable element to any input of itself or any other programmable element.

By using a random access memory (RAM) each programmable element can emulate a wide variety of sequential logic functions. The primary reliance on RAM provides the further benefit of fast productization using state of the art semiconductor processes. Extensive use of wire-ORing in the programmable elements and the state processor switch eliminates unwanted logic delays and provides a mechanism to implement discrete circuitry. The network is flexible in reconfigurations of programmable elements. Since the programmable elements are simple components of state processors, and state processors may be networked at yet another level, the entire invention is modular and therefore easy to modify and test. Simplicity also translates into a low cost of design and manufacture.

Accordingly, the present invention is a number of programmable state machines and a switching network to interconnect the machines. Each programmable element can perform functions usually implemented with discrete logic including sequential and combinational circuits. More complex functions can be implemented by networking multiple programmable elements with a matrix switch.

The basic programmable element comprises a random access memory (RAM), a load address register and a run address register. The load address register is used during initialization to address memory locations in the RAM that are loaded with data to define a state transition table.

The run address register is active during the run mode of the programmable element. The run address register receives inputs external to the programmable element and accepts feedback output data from the RAM. Thus, at each clock cycle, the programmable element changes state from a present state, located in the run address register, to a next state, located in the feedback output from the RAM.

The run address register and the load address register are selectively switched into the address inputs on the RAM. Preferably, the run address register and the load address register are implemented in emitter coupled logic (ECL) or another suitable logic family permitting wire-ORed, or other party line interconnections, so that the two registers may be selectively switched for even faster operation.

Emulations of logic circuits are manifested by loading the programmable element memory with a table which maps the programmable element's present state and inputs to the programmable element's next state and outputs. The feedback bits are storage for the next state. Within the address space allocated to each of the present states is the specification the next state and the output bits for the present state.

One of the factors which contributes to the programmable element's speed and flexibility is the use of RAM as a major functional element. Random access memory represents one of the simplest and most regular circuits found in digital electronics. Because of these attributes, as new semiconductor processes are developed, memory devices are typically the first components to be fabricated. Thus, by using RAM, the programmable elements utilize and take advantage of state of the art semiconductor technologies leading to smaller size and faster response.

A switching network of programmable elements, i.e., a state processor (SP), includes a number of programmable elements and a matrix switch. At least three different embodiments of the matrix switch are possible. First, the matrix switch may be of conventional non-blocking type, comprising a number of data selectors, one for each output, that can connect any matrix switch input to any set of matrix switch output s. Conventional data selectors/multiplexers can be used. Second, and preferably, this embodiment of the matrix switch is implemented by wire-ORing. The wire-ORing technique can also be implemented optically by using optical shutter arrays. The optical wire-OR technique provides a fast response time. Third, the data selector can be implemented using a multi-level RAM memory. This technique allows the greatest flexibility since many combinational logic functions can be implemented in the RAMs.

To illustrate the power of a state processor, any of the $D^5$ functions mentioned above may be implemented on a state processor. In fact, multiple state processors may be networked into an even larger switching network.

These and other objects and features of the present invention will become more fully apparent from the following description and appended claims taken in conjunction with the accompanying drawings.

DESCRIPTION OF THE PREFERRED EMBODIMENTS

Figures 1, 2:
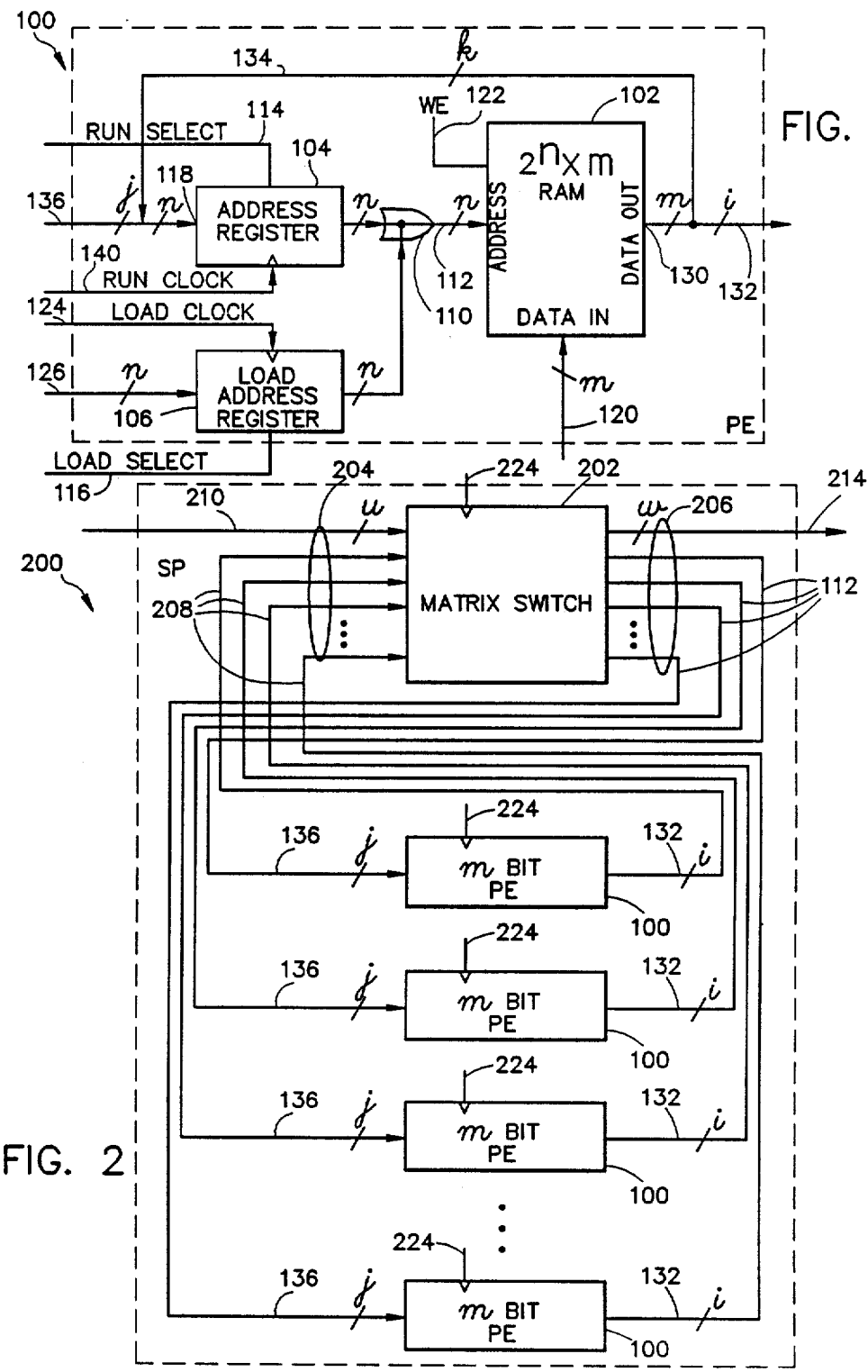
FIG. 1 is a block diagram of a canonical programmable element (PE) comprising a random access read/write memory (RAM), a run address register having external data inputs and feedback from the RAM, and a load address register interconnected to provide a state machine that can be loaded with a state transition table from an external source.
FIG. 2 is a block diagram of a canonical state processor (SP) showing M processor elements (PEs) and a P×Q matrix switch having a set of external inputs and external outputs, and having interconnections from the outputs of the PEs and to the inputs of the PEs.

FIG. 1 illustrates a programmable element (PE) 100 in accordance with the present invention. As illustrated, the programmable element 100 is a programmable state machine that includes a random access read/write memory (RAM) 102, a run address register 104, a load address register 106 and an address selector 110.

In the preferred embodiment, the RAM 102 is an $2^n$-word by m-bit per word RAM (i.e., a $2^n \times m$ RAM). For example, in one particularly preferred embodiment, the RAM 102 is a 4096 word by 12-bit RAM wherein m and n are both equal to 12. Preferably, the RAM 102 is a static RAM and does not require refresh cycles in order to maintain its data. In one particularly preferred embodiment, the RAM 102 comprises 12 4096×1-bit ECL static random access memories, such as the 10470 available from American Micro Devices, National Semiconductor, or other sources.

The RAM 102 is provided with an n-bit address input on a set of address input lines 112 from either the run address register 104 or the load address register 106 via the address selector 110. The address selector 110 is connected to the outputs of the run address register 104 and the load address register 106 and provides an address output corresponding to the output of only one of the two address registers at any one time. In the preferred embodiment described herein, the address selector 110 comprises the outputs of the run address register 104 and the load address register 106, which are wire-ORed together so that the respective outputs are connected directly to the address input lines 112 without interposing any additional propagation delay. The run address register 104 and the load address register 106 of the programmable element 100 of the preferred embodiment are constructed using emitter-coupled logic (ECL) integrated circuits having an output circuitry that can be wire-ORed together in a party line configuration. For example, the run address register 104 and the load address register 106 advantageously comprise ECL hex D flip-flops, such as the 100151, available from Fairchild, Signetics, or other sources. The 100151 circuits have a master reset line that disables the Q outputs of the flip-flops. It should be understood that other logic families, such as TTL (transistor-transistor logic) can be used, in which case, the address registers 104, 106 can be interconnected by wire-ORing open collector circuits or by using tri-state circuits.

The run address register 104 and the load address register 106 are selectively enabled so that the outputs of only one of the load address register 106 and the run address register 104 are enabled to the address input lines 112 of the RAM 102 at any one time. The load address register 106 has its outputs enabled to the address input lines 112 during the initialization process. The run address register 104 has its outputs enabled to the address input lines 112 when the programmable element 100 is running. For example, a run address select line 114 is provided as an input to the run address register 104 that enables the run address register 104 when the line 114 has an active logic state and disables the run address register 104 when it has the opposite logic state. Similarly, a load address select line 116 is provided as an input to the load address register 106 that enables the load address register 106 when the line 116 has an active logic state and disables the load address register 106 when the line 116 has the opposite logic state. Suitable logic (not shown) is provided to assure that the two address select lines 114 and 116 are not active at the same time, thus preventing both address registers 104, 106 from being active at the same time.

In alternative embodiments, the address selector 110 may comprise a conventional data selector/multiplexer (e.g., a 12-bit 2:1 multiplexer, not shown) having logic gates for routing the addresses from the two address registers 104, 106.

The RAM 102 is provided with an a set of m data inputs via a set of data input lines 120 that are provided by an external source (not shown). A write enable (WE) signal input on a line 122 is provided to strobe data from the set of data input lines 120 into the RAM 102. The data is strobed into the RAM 102 at an address location that is determined by the address provided by the load address register 106. The load address register 106 is provided with an n-bit address input on a set of lines 126 from an external source (not shown) which is clocked into the load address register 106 by activating a load clock signal on a load clock line 124. During the initialization mode, the load address register 106 has its outputs enabled to the address input lines 112 via the appropriate logic level on the address select line 114. Thus, during the loading or initialization of the programmable element 100, an address and the data to be stored at the address are provided as inputs to the RAM 102 and the write enable signal is strobed to cause the data to be stored. The address is then changed to the next address, the data changed accordingly, and the write enable strobed to store the next data, and so on until the RAM 102 is initialized with data. The RAM 102 can be initialized by sequentially addressing all the locations in the RAM 102 or, in the alternative, any given address in the RAM can be addressed and data stored at the location associated with the address.

The RAM 102 provides m data output signals on a set of m output lines 130. The data output signals correspond to the data stored at the location associated with the address on the address input lines 112. As further illustrated, the m data output bits from the RAM 102 comprise i bits that are provided as outputs from the programmable element 100 on a set of output lines 132 and k bits that are provided as feedback bits to the run address register 104 via a set of feedback lines 134 that are internal to the programmable element 100. For example, in the described embodiment where m is equal to 12, i is equal to 4 and k is equal to 8.

The k data bits on the feedback lines 134 to the run address register 104 define the next state of the programmable element 100 and are presented as the most significant input bits to the run address register 104. In the particular embodiment described herein, the k data bits are the eight most significant bits to the run address register. A set of j input lines 136 are provided from an external source (not shown) to the j least significant input bits of the run address register 104. The j input lines 136 and k feedback lines 134 together provide the n address signals required to define the next address location of the RAM 102 (i.e., j+k=n). In the preferred embodiment, j is equal to 4, and thus the j input lines 134 provide the four least significant bits to the run address register 104. It should be understood that other combinations of feedback bits and input bits can be used to provide the n address input lines.

When the programmable element 100 is running (i.e., is in the run mode), the run address register 104 is periodically clocked by a run clock signal on a run clock line 140. Each time the run address register 104 is clocked, the k next state feedback lines and the j input lines are concatenated and are provided as the n address inputs to the RAM 102 via the data selector 110 and the address input lines 112. Thus, the k next state output bits on the input to the run address register 104 become the k present state address bits to the RAM 102. The clocked j data input bits from the external source together with the k present state bits on the output of the run address register 104 define the current address for the RAM 102 during the run mode of operation. After a short delay following the clocking of the run address register 104 (e.g., less than 25 nanoseconds in the preferred embodiment), referred to as the address access time of the RAM 102, the data stored at the addressed location in the RAM 102 is presented as m data output signals on the RAM data output lines 130. The memory location addressed by the current address input to the RAM 102 stores the i (e.g., 4) bits of element output data associated with the current address, and the k (e.g., 8) feedback bits that identify the next state associated with the current address. Thus, when the run address register 104 is clocked again, the above-described process is repeated with the next memory address again being defined by the k present state bits and the j data input bits. Thus, it can be seen that the contents of the data storage location in the RAM 102 comprise a state transition table which maps the next present state and input of the programmable element 100 into a next state and outputs as described above.

The RAM 102 is loaded with data during the initialization mode so that the k next state data bits and the j element output data bits stored in the address locations of the RAM 102 cause the programmable element 100 to function in response to the data input bits in a manner equivalent to discrete logic circuitry. The discrete logic functions are implemented by loading the RAM 102 with a state transition table that operates as described above. The state transition table represents the program of the state machine, or programmable element 100.

As set forth above, the RAM 102 in the preferred embodiment is a 4096 word by 12-bit RAM. However, in alternative embodiments, the data word size can be increased to provide more outputs for each state while the address space remained fixed in which case m>n. In further alternatives, the number of address locations in the RAM can be decreased if less possible states are required.

The state transition table to be loaded into the RAM 102 is developed off-line and is represented externally to the programmable element 100 as a logical set of binary words. The state transition table must be less than or equal to the size of the RAM 102. The state transition table is advantageously loaded into the RAM 102 sequentially, word by word, as discussed above. The process of loading the state transition table into RAM 102 is also known as processor initialization.

As has been shown, a programmable element 100 has architectural parameters, such as the number of programmable element outputs 130, which can be specified so as to optimize a given application. However, the flexibility of the programmable element architecture 100 is chiefly related to the selection of RAM 102. The programmable element architecture can be optimized to satisfy power, speed, state table size and circuit density requirements. For example, when memory size is increased, more complex logic circuits can be implemented. On the other hand, as memory size decreases, memory access time decreases and therefore the state machine can execute state transitions more rapidly.

When more complex logic circuits, implemented by state machines, are desired, multiple programmable elements 100 can be networked. A network of programmable elements 100 is called a state processor (SP) 200, as shown in FIG. 2. The state processor 200 comprises a plurality M (e.g., 6 in FIG. 2) of programmable elements 100, such as the programmable elements already described, and a switch 202. The switch 202 has a set of P input lines 204 and a set of Q output lines 206. As illustrated, the P input lines 204 to the switch 202 comprise a first set 208 and a second set 210 of input lines from two sources, one of which is internal to the state processor 200 and one of which is external to the state processor. The first set of v input lines 208 comprises the j output lines 132 from each of the M programmable elements 100 (i.e., $v=M\times j=6\times 4=24$ in the preferred embodiment). The second set of input lines 210 comprises u input lines from an external source (not shown). In the preferred embodiment, u is equal to the number of programmable element inputs 136, j (i.e., 4 in the preferred embodiment). However, other numbers of input lines can also be provided.

As further illustrated, the Q output lines 206 from the switch 202 comprise a first set of x output lines 212 and a second set of w output lines 214 to two destinations. The x output lines 212 comprise the i input lines 136 to each of the M programmable elements 100 (i.e., $x=M\times i$). The w output lines 214 comprise output lines to an external destination (not shown).

In the preferred embodiment, the switch 202 is a matrix switch which allows any of the $M\times i$ programmable element output lines 132 and any of the u input lines 204 on its data input to be routed to any of the $M\times j$ programmable element input lines 136 and the w output lines 206. Thus, the switch 202 is referred to as a non-blocking switch such that any one of its inputs can be connected to more than one of its outputs.

The combination of the M programmable elements 100 and the switch 202 provides the state processor 200 with the programmability usually associated with a general purpose computer, but it also has the throughput normally associated with digital logic circuitry. Both of these features are necessary for flexible, real-time processing. The chief function of the state processor 200, therefore, is to process serial bit streams of data in real-time.

In the state processor 200, the matrix switch 202 is the functional component which allows a plurality of programmable elements 100 to send and receive data amongst themselves. In general, the switch 202 is configured by the command input prior to beginning algorithm execution and the switch 202 remains stable while the algorithm is executing.

The foregoing example was presented in terms of six programmable elements 100, each having four data inputs 136 and four data outputs 132, along with four data inputs 210 from an external source to the matrix switch 202 and four data outputs 214 to an external destination from the matrix switch 202. As set forth above, the total number of inputs P to the P×Q matrix switch 202 comprises the number u of state processor input lines 210 added to the number v of programmable element output lines 208, or $P = u + v = u + (M \times i)$. Similarly, the number of outputs Q comprises the number w of state processor output lines 214 added to the number x of programmable element input lines 212, or $Q = w + x = w + (M \times j)$. In an alternative embodiment (not shown), a state processor comprising M=4 programmable elements with each programmable element 100 characterized by i=j=5, and u=v=5, then the matrix switch configuration is a 25×25 switch (i.e., $P = u + (M \times i) = 5 + (4 \times 5) = 25$, and $Q = v + (M \times j) = 5 \times (4 \times 5) = 25$. Other switches for different quantities of programmable elements and different numbers of inputs and outputs can of course be configured.

A global state processor clock input 224 synchronizes the activities of the programmable element network. The global state processor clock 224 is the source of the programmable element clock input 140 for each of the programmable elements 100, described above. For real-time serial bit streams with multiple dependent processing phases the network may be configured as a pipeline. The network can also be configured for independent parallel operation, or array processing, where a set of data is broadcast to multiple programmable elements simultaneously in a single time period. Of course any mix of parallel processing architectures is allowed by the matrix switch.

Figure 3:
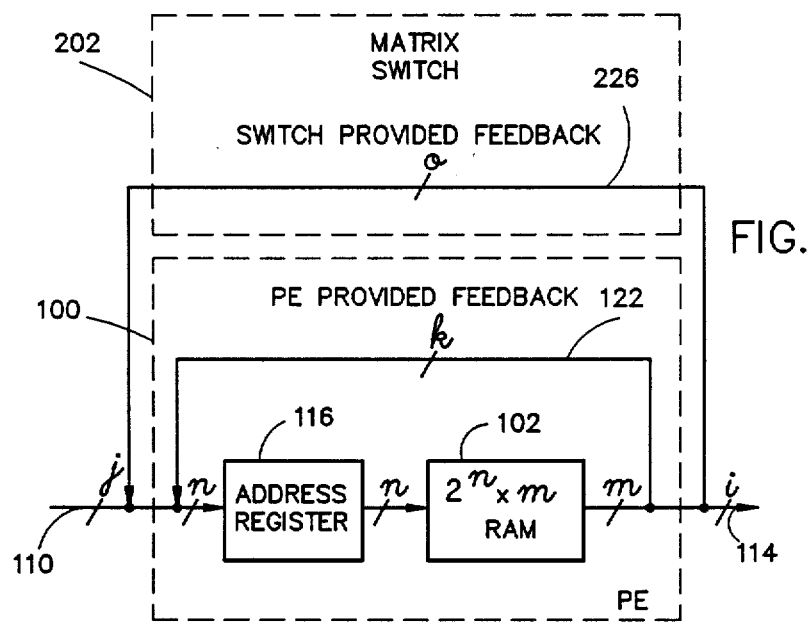
FIG. 3 is a block diagram of a canonical programmable element (PE) with external PE feedback lines that are provided by the matrix switch of FIG. 2.

In FIG. 3, a programmable element 100 is shown as it would exist inside of a state processor network 200. In this figure, o external programmable element feedback lines 226 provided by the switch 202 are shown interconnecting a subset of programmable element outputs 132 to a subset of programmable element inputs 130. Thus, outputs 132 of a programmable element 100 may be fed back into the programmable element inputs 130 by connecting programmable element output lines 132 to programmable element input lines 130 via the switch 202. This external feedback technique allows flexibility in the number of feedback paths which can be allocated to each programmable element 100. Without the o external programmable element feedback lines 226, the programmable element 100 would be limited to the k internal programmable element feedback lines 134. A programmer thus has the option of trading input lines for feedback lines.

Figure 4:
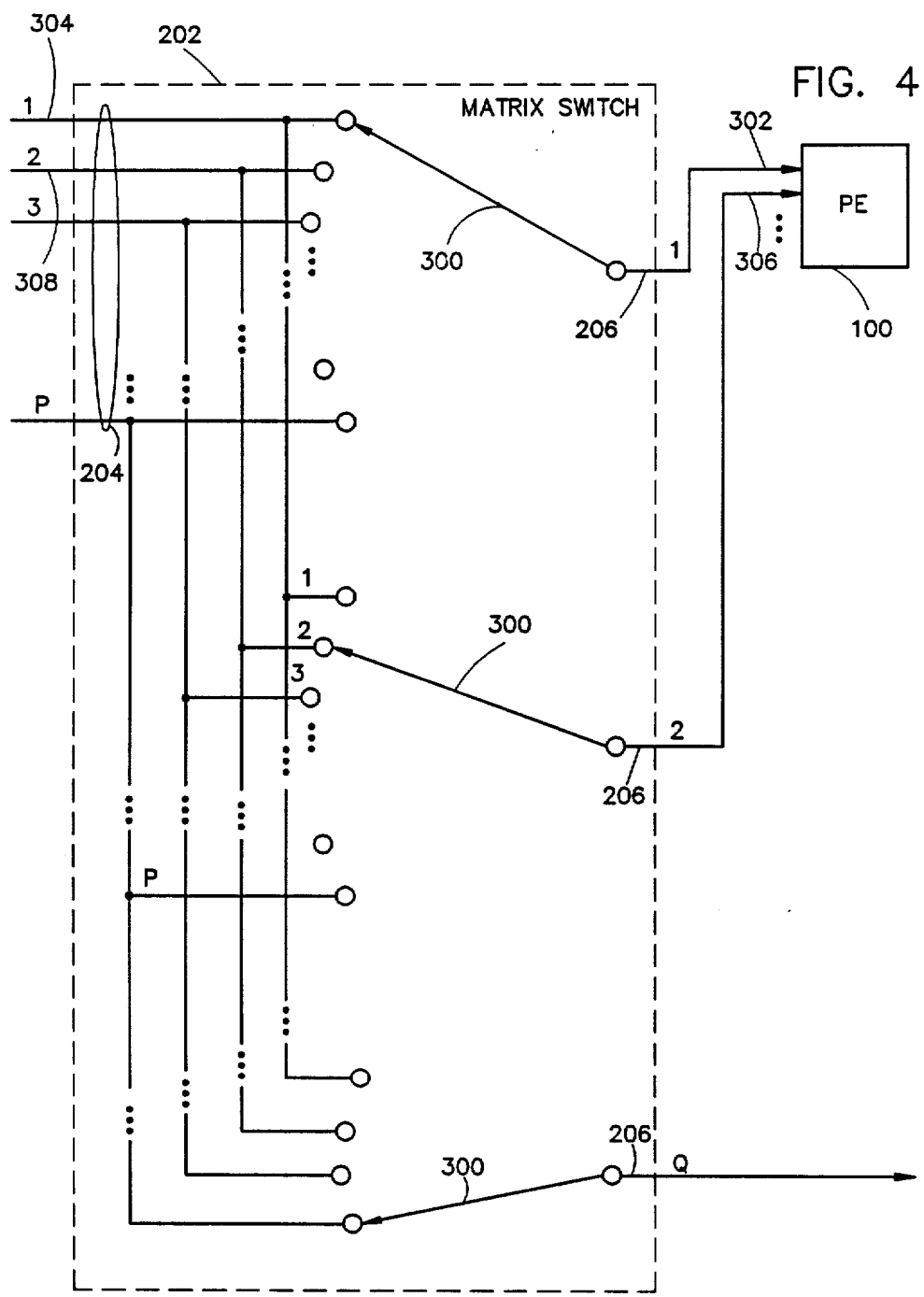
FIG. 4 is a functional block diagram of the state processor matrix switch.

The switch function 202 may be implemented in a variety of ways. Three embodiments of the matrix switch 202 are presented here. Functionally, the matrix switch 202 has each of the P switch inputs 204 tied in its own crossbar to the Q switch outputs 206. The functional block diagram of the matrix switch 202 is presented in FIG. 4. In this figure, the P inputs 204 are fanned-out vertically. The Q outputs 206 intersect the P inputs 204 at the switches 300. Each output 206 can be connected to any input 204. For example, the programmable element 100 is shown receiving a first input 302 from an input number one 304, and its second input 306 from an input number two 308.

Figure 5:
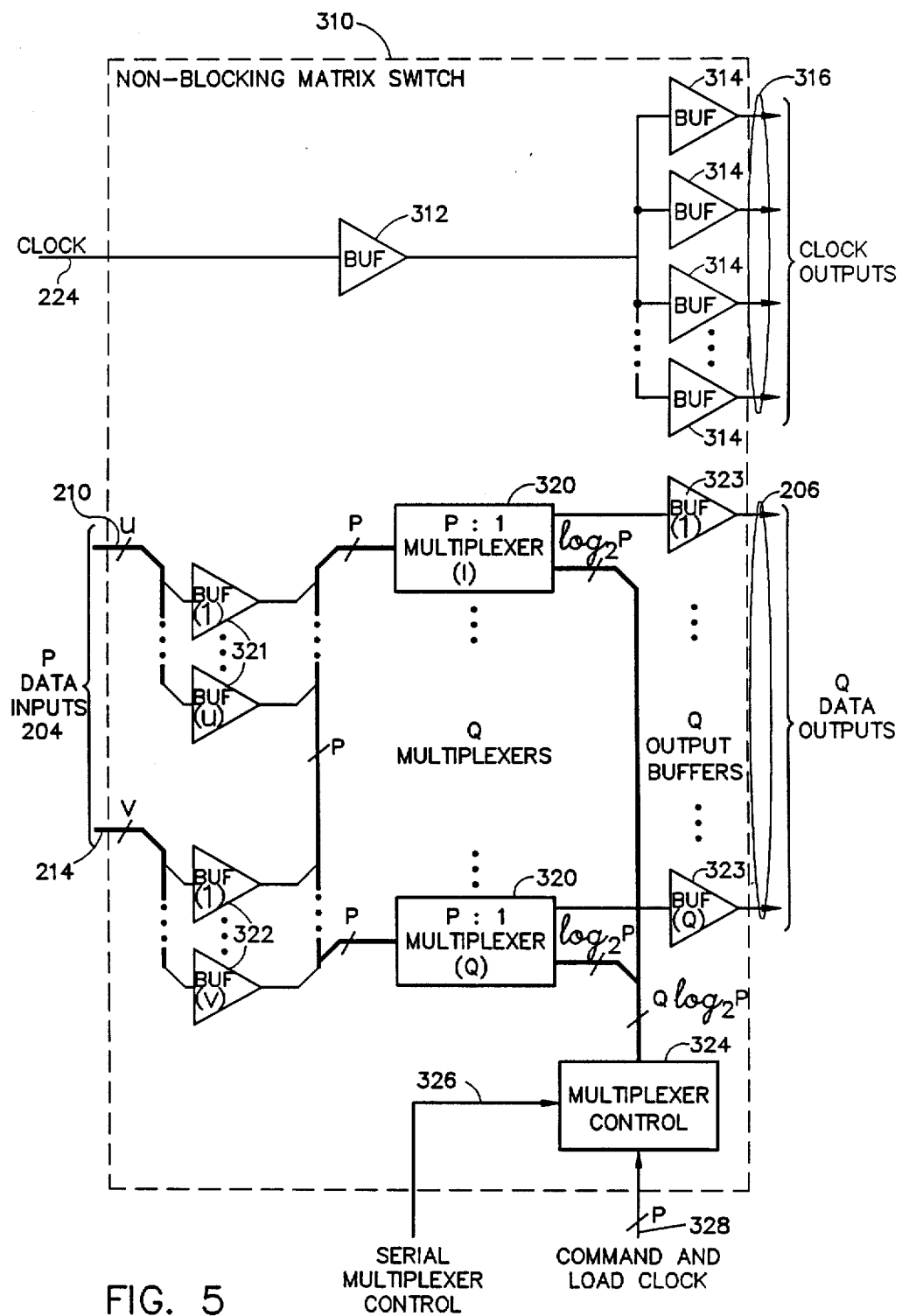
FIG. 5, is a logic schematic diagram of a non-blocking matrix switch.

A logic schematic diagram for a non-blocking matrix switch 310 is shown in FIG. 5. The global clock source 224 is buffered by a buffer 312 and then passes through clock fan-out buffers 314 which distribute the clock signal 224 to the M destination programmable elements 100 with one clock output 316 per programmable element (only four of the M fan-out buffers are shown). The u state processor inputs 210 are distributed to Q, P:1 data selectors (multiplexers) 320 via a set of input buffers 321. Similarly, the v switch feedback inputs 214 are distributed to the Q, P:1 data selectors 320 via a set of input buffers 322. Each of the P:1 data selectors 320 has P inputs comprising the u state processor inputs 208 and the v switch feedback inputs 212. Further, each data selector 320 provides one output which is logically connected to one of the Q outputs 206. The data selector outputs are buffered by a set of data selector output buffers 323. The data selectors 320 are controlled from a data selector control buffer 324 and indirectly by a serial control line 326 and a command and control clock 328. The data selector control 324 buffers the control signals to each of the P data selectors 320 so that the serial input is isolated from the parallel outputs. By buffering the serial inputs in this manner, a new set of switch configuration commands may be input to the switch 310, awaiting a new initialization mode, while the programmable elements 100 are still in run mode. During the next initialization mode, the switch configuration data is transferred to the output of the control 324 to set up the next switch configuration. For each data selector 320 there are $\log_2 P$ (rounded to the next larger integer) control inputs. Thus, the control buffer 324 must be a depth of at least $Q\log_2 P$ bits.

Figure 6:
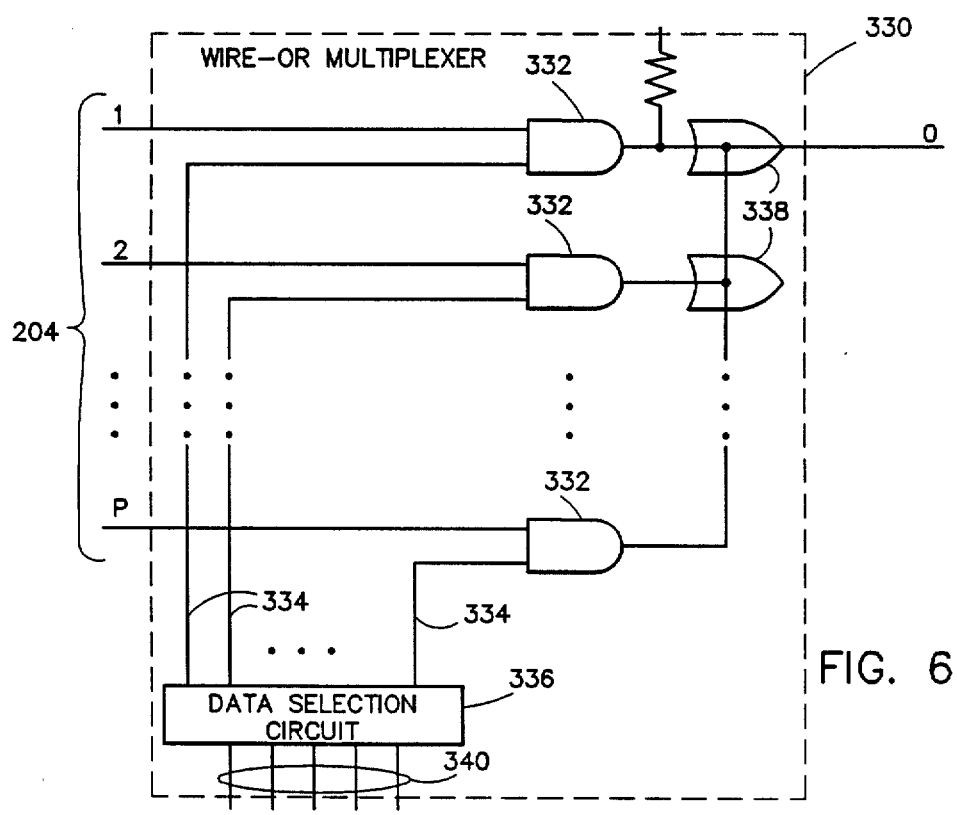
FIG. 6 is a logic schematic diagram of a wire-OR embodiment of the state processor matrix switch.

A preferred alternative to the non-blocking switch 310 of FIG. 5 is a wire-OR switch, as illustrated in FIG. 6. In FIG. 6, one data selector 330 for one of the Q outputs 206 of the P×Q matrix switch 202 is illustrated. The P inputs 204 are ANDed via the AND gates 332 with the outputs 334 of a data selection circuit 336 having a plurality of inputs 340. The AND gates are preferably ECL devices which are wire-ORed together (represented by OR gates 338). The wire-ORs 338 for each of the Q switch outputs 206 are electrically interconnected. By placing a data selection address at the inputs 340 to the data selection circuit 336, one or more of the P inputs 204 is enabled onto one of the Q matrix switch outputs 206 (only one shown).

One embodiment of the data selection circuit 336 is a decoder which enables only one AND gate 332 at any one time. Preferably, the data selection circuit 336 can provide more than one active output at any one time to enable more than one of the AND gates 332. In this preferred implementation, more than one of the P inputs 204 can be logically ORed together to feed one of the Q outputs 206. By combining this feature with the use of true and complement outputs from the programmable elements 100, more complex logic functions can be provided by the wire-OR switch 330 without the need for additional inputs from the programmable elements 100.

The wire-ORed implementation is limited to those logic families which allow wire-ORs. Where applicable, this implementation features high speed and flexibility. The switch 330 offers high speed because gate delays are minimized by wire-ORs. Switch flexibility arises from the notion that any combinational logic circuit expressible in standard Boolean logic form may be implemented from a two level circuit. For example, using ECL circuitry, a first level of NOR gates implemented inside the programmable elements and a second level of wire-ORs, which can be complemented, all standard Boolean expressions can be implemented, as discussed above.

Figure 7:
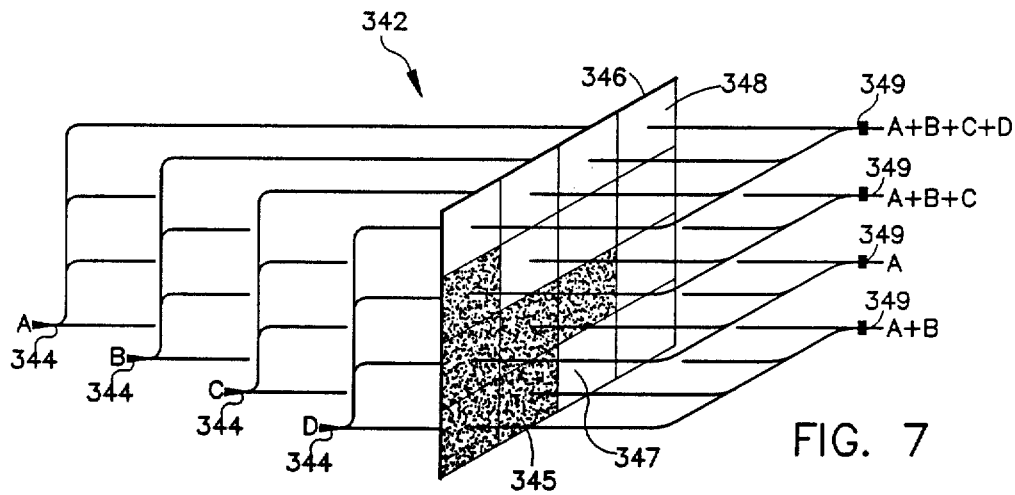
FIG. 7 is a block diagram of an optical wire-OR switch which uses liquid crystal optical shutters or another light modulating array.

An optical version of the matrix switch 342 which provides an optical wire-OR is shown in FIG. 7. The wire-OR matrix switch 342 is obtainable with faster optical technology which is independent of any semiconductor logic family. The switch 342 can broadcast one input onto several outputs, or map multiple input channels onto one output (the effect of wire-ORing). In FIG. 7, fiber optic photoemitters 344 are directed in columns through an array of optical shutters 346. The array has programmable windows 348 which become opaque 345 when no connection is desired and become translucent 347 when a connection is desired. The light from each shutter in a particular row of shutters is optically combined and the combined light is detected by a set of photodetectors 349, with each of the photodetectors 349 positioned to receive the combined light from one row. Alternatively, the light from each shutter can be detected by a photodetector, and the electrical outputs from the photodetectors of each row combined electrically.

In current practice the optical shutter 348 is an electrically switched half-wave plate made from PLZT, a transparent ceramic material, which is sandwiched between two cross-polarizers. Other shutter materials such as liquid crystals have also been used. An exemplary optical matrix switch which uses PLZT is the 4-by-4 generalized crossbar switch produced by Optivision.

The optical matrix switch 342 is desirable for a number of reasons. First, crosstalk, RFI and dispersion are reduced because of the use of fiber optics to direct the light vis-a-vis wires in the electrical wire-OR switch 330. Second, the signal routing is essentially speed of light, therefore delay is substantially reduced. Furthermore, the optical switch 342 is easily expandable, small in size, low in weight and low in power consumption and dissipation.

Figure 8:
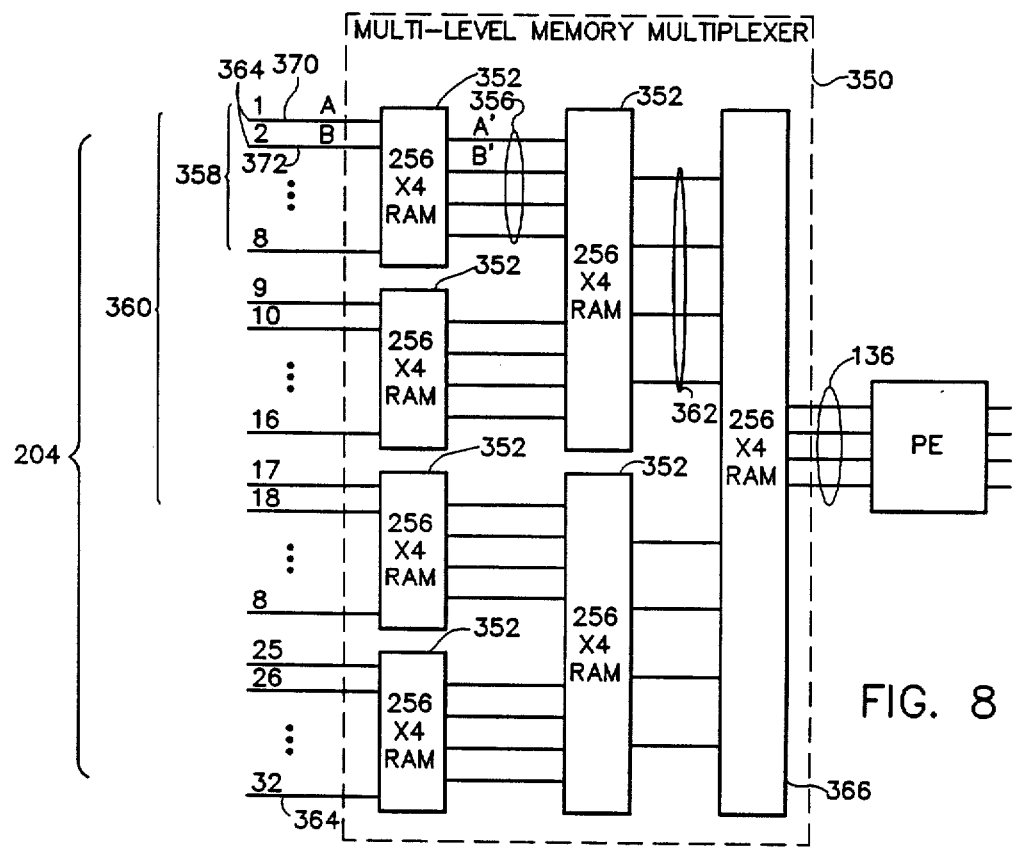
FIG. 8 is a detailed block diagram of a multi-level memory embodiment of the state processor switch.

A third matrix switch embodiment is illustrated in FIG. 8 which shows a data selector for four output bits. The data selector of FIG. 8 is a multi-level memory matrix 350 that comprises a plurality (e.g., 7) of 256 word by 4-bit RAMs 352 having first, second and third levels looking from left to right, as illustrated. This particular embodiment shows one P:4 data selector where P is equal to 32 and each programmable element 100 (one shown) has j=4 programmable element inputs 110. The RAMs 352 are loaded with look-up tables. Turning to the first level of RAM memory 352, the maximum number of RAM outputs 356 from the first 8 RAM inputs 358 cannot be any greater than 4. At the second level, 16 RAM inputs 360 at level 1 have been multiplexed into 4 RAM outputs 362. At level three, all 32 switch inputs 204 of level one are multiplexed into a level three RAM 352 with maximum of 4 RAM outputs or programmable element inputs 136. As an example of RAM programming, assume a level one switch (256×4 RAM) to pass through switch input A 370 and switch input B 372 (being the least significant address bits) to the least significant outputs A' 374 and B' 376. In this example, the following set of tuples (address, data) would completely specify the 256 word RAM memory: {(xxxxxx00,xx00), (xxxxxx01,xx01), (xxxxxx10,xx10), (xxxxxx11,xx11)}.

The memory switch 350 is the slowest of this group of switches and the more levels of memory there are the greater the loss in speed of operation. Nonetheless, by using the memory switch 350, many combinations of logic may be coded into the switch 350 by programming the RAMs 352 at each level. Thus, the multi-level memory switch 350 is the most flexible of the lot.

The state processor 200 is useful, among other things, for processing high-speed serial bit streams. One exemplary digital communications algorithm used in communications systems which can be implemented by the state processor 200 is digital data scrambling.

Digital data streams may have short-cycle periodic patterns. These patterns sometimes cause problems in bit synchronization between the transmitter and receiver. For example, long strings of 1s might cause a bit synchronizer to drop synchronization. If this were allowed, it would result in long bursts of data errors. To satisfy this objective requires a scrambler, or randomizer, on the transmitter data stream and a descrambler, or derandomizer, on the receiver side.

Therefore, to avoid data errors, a pseudo-random pattern (white noise) is exclusive-ORed with the bit streams on both sides of the communication channel. The exclusive-OR is an odd function. This means that the result of the function is equal to 1 if the input variables have an odd number of 1's. Thus, after a data stream, $D_i$, is transformed into a scrambled data stream, $S_i$, by a scrambler circuit, i.e., $S_i = D_i \oplus R_i$, the descrambler cancels out the pseudo-random pattern, $R_i$, with itself as follows:

$$D_i = S_i \oplus R_i = (D_i \oplus R_i) \oplus R_i = D_i \oplus (R_i \oplus R_i)$$
$$= D_i \oplus 0 = D_i$$

Figure 9:
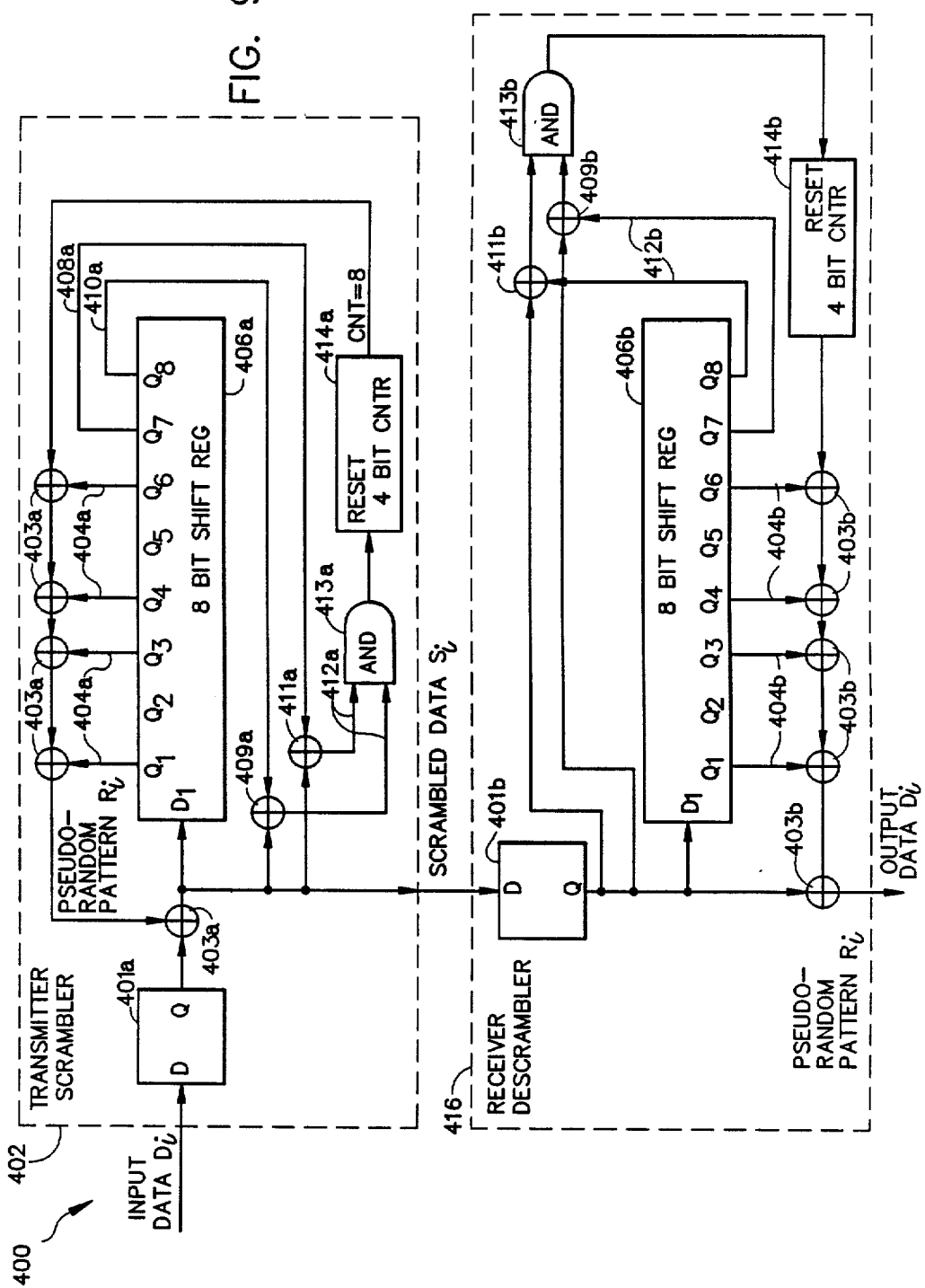
FIG. 9 is a logic schematic diagram of exemplary randomizer (scrambler) and derandomizer (descrambler) circuits which can be implemented with a state processor.

An example of a scrambler/descrambler logic circuit 400 is shown in FIG. 9. The circuit illustrates a single counter scrambler (SCS). Such circuits can be found in the prior art. In this embodiment of the single counter scrambler, serial data input is first buffered by the D flip-flop 401a. In the scrambler circuit 402, a pseudo-random bit pattern $R_i$ is modulo-2 added to the data stream $D_i$. In this single counter scrambler 402, the random pattern $R_i$ is defined by the taps 404a coming from an 8-bit shift register 406a. The modulo-2 addition is accomplished with exclusive-OR gates 403a.

In addition, two period detector circuits are used, as represented by taps 408a, 410a from shift register outputs $Q_7$ and $Q_8$ respectively. These taps 408a, 410a will detect the period of their respective time delays as well as all submultiples thereof. The output $Q_7$ on the tap 408a is exclusive-ORed with the scrambled output data in an exclusive-OR gate 411a. When the scrambled data has a period of 7 or 1 the output of the exclusive-OR gate 411a will be a 0. The output Q8 on the tap line 410a is exclusive-ORed with the scrambled output data by the exclusive-OR gate 409a. When the scrambled data has a period of 8, 4, 2 or 1, the result of the exclusive-OR operation will cause the output of the exclusive-OR gate 409a to be a 0. The outputs of the exclusive-OR gates 409a, 411a are provided as inputs to an AND gate 413a. When the output of either of the exclusive-OR gates 409a, 411a is a 0, the output of the AND gate 413a is 0. The output of the AND gate 413a is provided as a reset input to a counter 414a, which is reset to 0 when the reset input is equal to 1. Thus, so long as one of the periods is detected by either the exclusive-OR gate 409a or the exclusive-OR gate 411a, the counter will count. If neither the exclusive-OR gate 409a nor the exclusive-OR gate 411a has a 0 output condition, thus indicating that none of the periods have been detected, the counter 414a will be reset to 0. If the counter 414a counts to 8 without being reset it provides a logic 1 output which is exclusive-ORed with the random pattern $R_i$ via the exclusive-OR gates 403a. Hence, the periodicity is removed. If there is no periodicity in the output, the counter 414a is randomly reset thereby maintaining a 0 input into the $R_i$ pattern. Thus there is only some small probability that the counter reaches its threshold and perturbs the pattern.

FIG. 9 also illustrates a single counter descrambler circuit 414 which performs the inverse function of the single counter scrambler 402 just described. The elements of the descrambler circuit 414 have been labelled with identical numbers as the corresponding elements in the scrambler circuit 402 except that a suffix "b" has been substituted in the descrambler circuit 414 in place of the suffix "a" for the elements of the scrambler circuit 402. One skilled in the art will understand that descrambler circuit 414 performs the same logical functions in the scrambled input data as the scrambler 402 performed on the descrambled input data. Thus, the descrambler 402 reproduces the descrambled data as its output.

Figure 10:
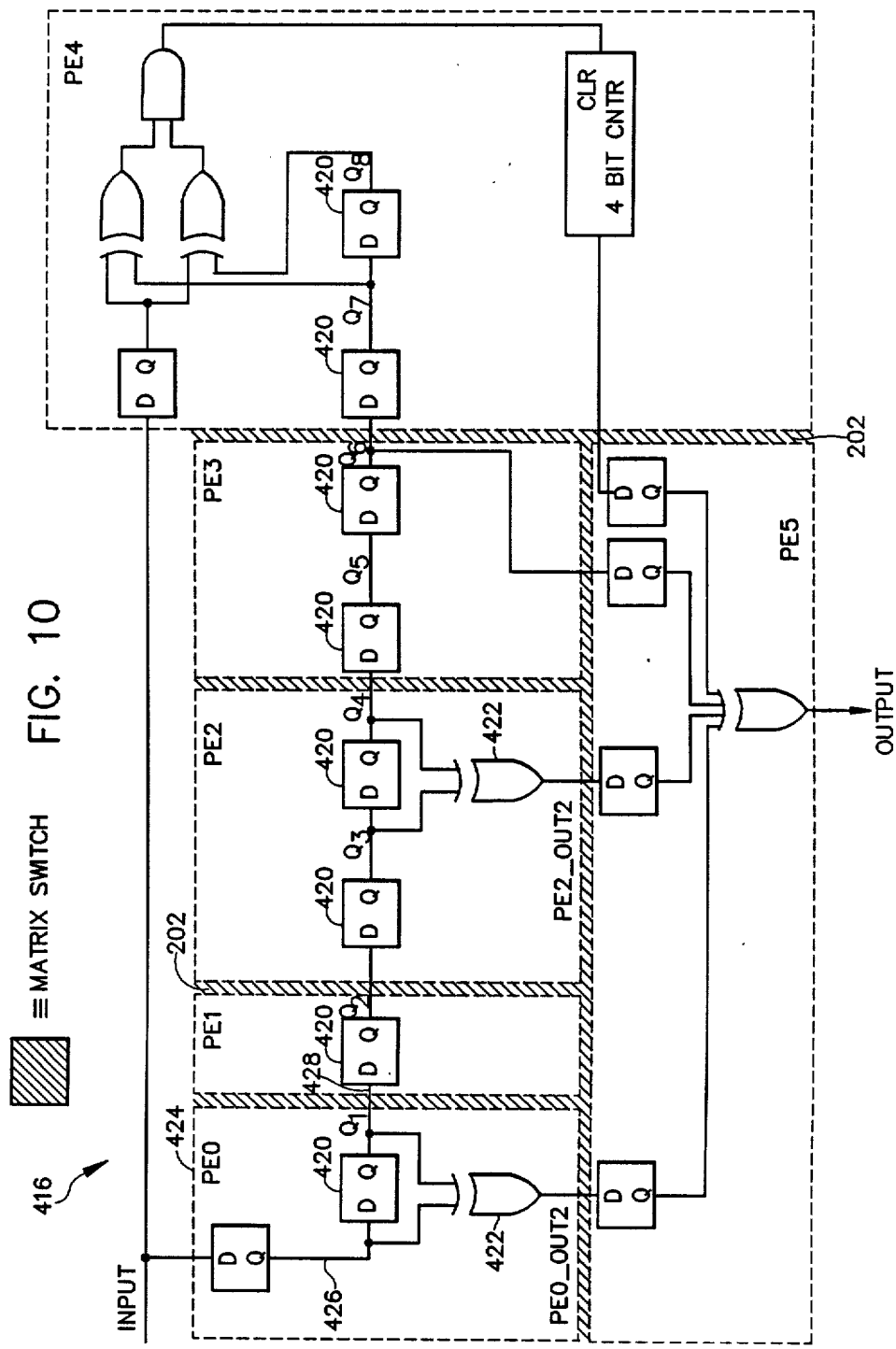
FIG. 10 is a block diagram illustrating the logical separation of the derandomizer circuit specified in FIG. 9 into subfunctions which are allocated to the programmable element (PE) resources of an embodiment of a state processor (SP).

In FIG. 10, the descrambler circuit 416 from FIG. 9 has been partitioned with dashed lines to show how logic circuitry can be allocated among the six programmable elements 100 of a state processor 200, wherein each of the programmable elements 100 has j=4 programmable element input lines 136, k=8 internal programmable element feedback lines 134, i=4 programmable element output lines 132, n=12 RAM address inputs 104, and m=12 RAM data input/data output lines 112, 130. The 6 programmable elements 100 are labeled PE0 through PE5.

In FIG. 10, the 8-bit shift register 406b, as shown in FIG. 9, has been decomposed into a series of D flip-flops 420. Furthermore, because the exclusive-OR function is associative, the exclusive-OR gates 403a of FIG. 7 have been replaced with an equivalent grouping of gates 422. Note that this allocation is not necessarily an optimal use of the programmable element resources but is merely an illustration of one way to allocate the descrambler circuitry 416 to programmable elements 100.

Figure 11:
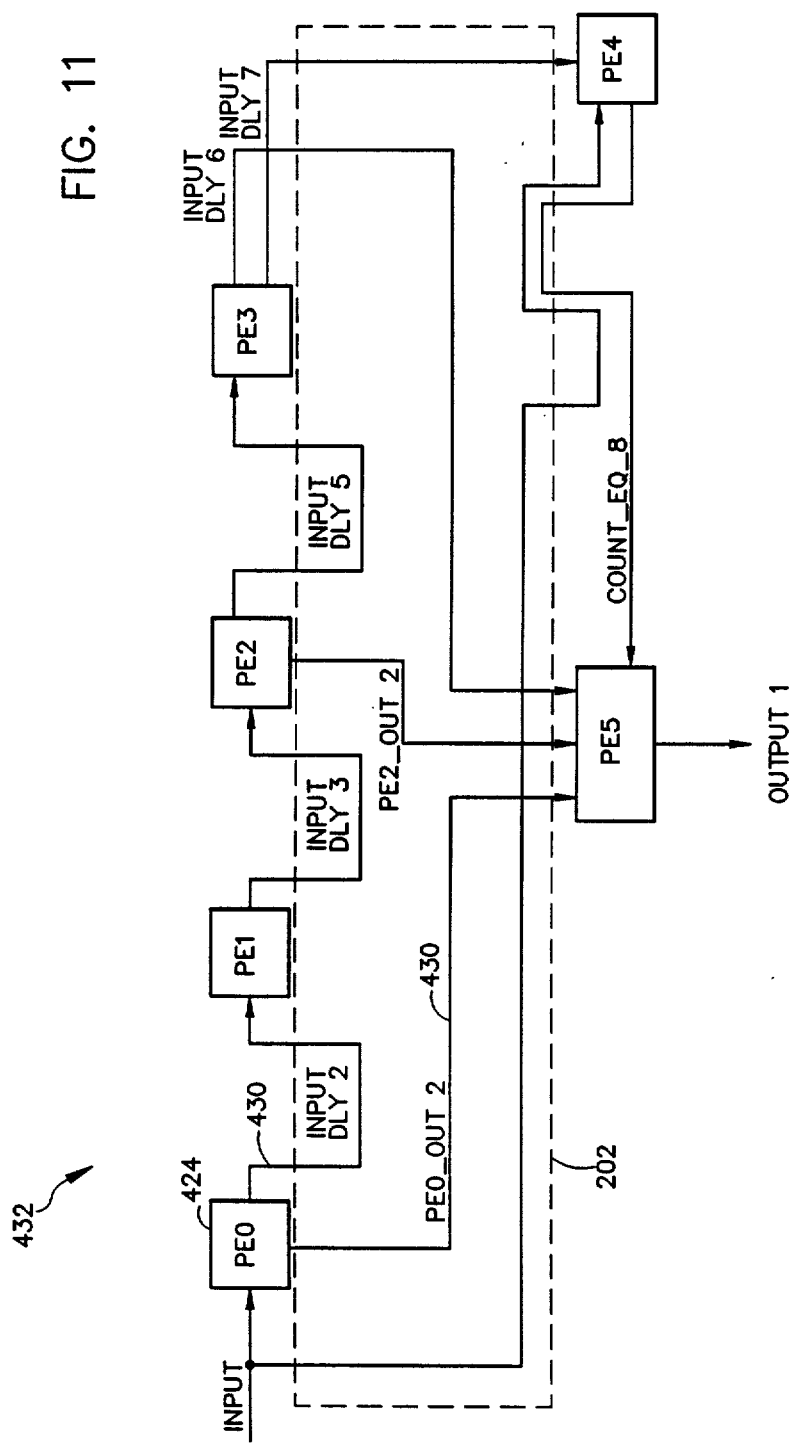
FIG. 11 is a block diagram of the state processor (SP) embodiment defined in FIG. 10 showing the programmable element (PE) configuration to implement the descrambler circuit shown in FIGS. 9 and 10.

To obtain a mapping from FIG. 9 to FIG. 10 is not too burdensome for one skilled in the art. However, one can imagine that many mappings, if accomplished by hand, would require an excessive amount of tedious work. Therefore, one desires an automated mechanism to map functional partitions into detailed hardware configurations. In the prior art, hardware description languages (HDLs) have been widely used for this task. After a hardware description language is developed, one can write a cross-compiler, also well known in the art, to perform this tedious task. In Table 1, a state processor cross-compiler source code for this allocation is shown. The output of the cross-compiler for the source shown in FIG. 10 is the programmable element configuration 432 shown in FIG. 11. Another output of the cross-compiler is the programmable element memory loads for initialization.

Figure 12:
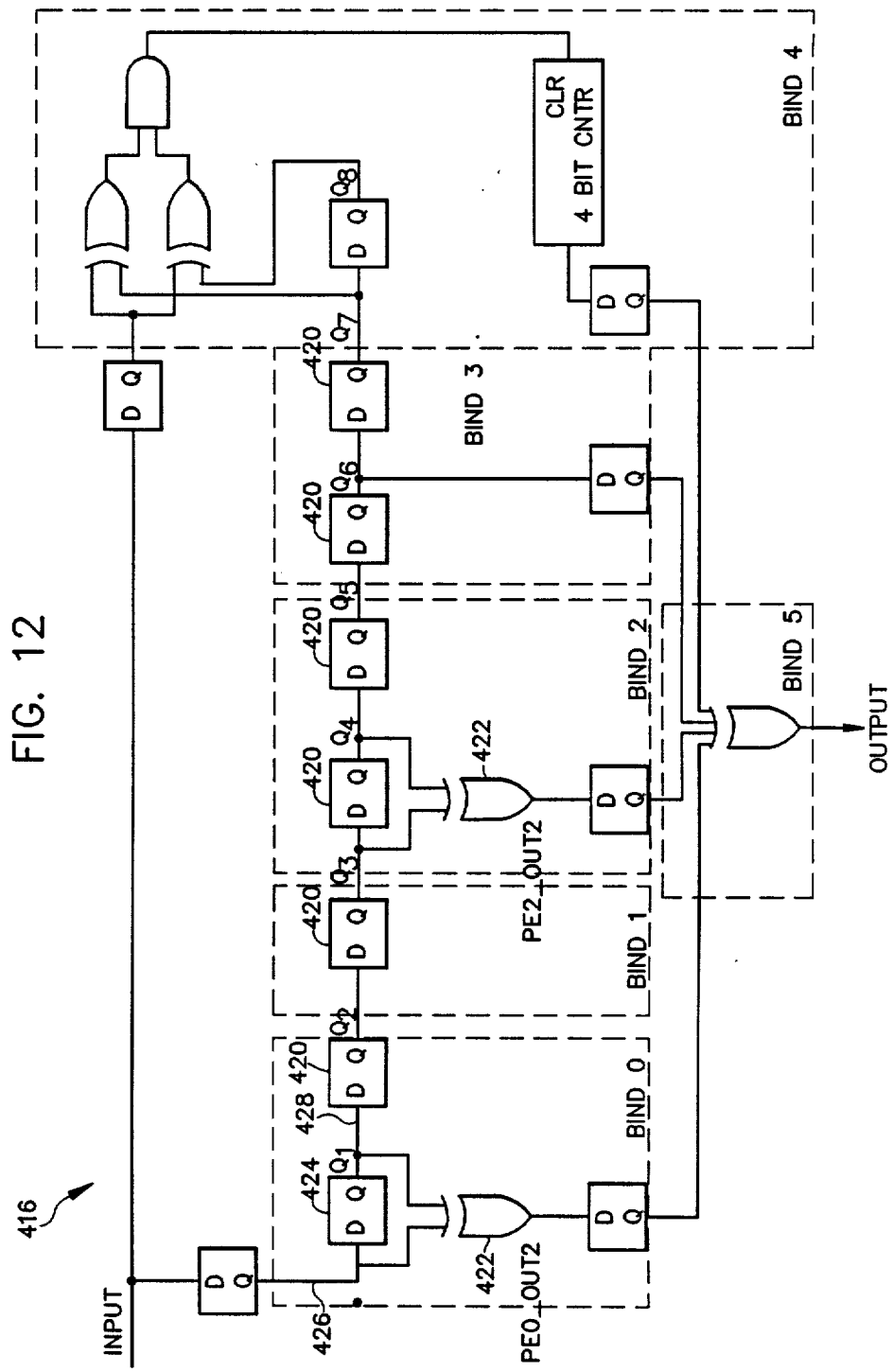
FIG. 12 is a block diagram illustrating the logical separation of the derandomizer circuit in accordance with FIG. 10, with the partitioning between circuit elements adjusted to conform with the cross-compiler that defines the interconnections of the state processor.

In FIG. 12, partitions, called BINDS, reflect the resource allocation of the state processor 200 as provided by the state processor cross-compiler, discussed above. The cross-compiler takes the programmable element resources and reallocates them into BINDS where each BIND shares the components of a programmable element less the programmable element input register and plus the register where the output data is destined. For instance, PE0 424 has been allocated the first and second flip-flops of the shift register 406b (FIG. 9). It also handles the exclusive-OR of the outputs 426,428 of these flip-flops, INPUT$DLY and INPUT$DLY1. The two global outputs of this programmable element 424 are INPUT$DLY2 428, which is fed to the next flip-flop of the shift register in PE1, and PE0_OUT2 430, an intermediate exclusive-OR output which is fed into PE5. These global outputs 428,430 are routed to their respective programmable elements 100 by an initial setting of the matrix switch 202 inside the state processor 200.

Table 2 is a binary memory load for PE0 424 in the descrambler circuit 416 of FIGS. 9-12. The address and data words have bit locations defined to be 0 through 11 reading from right to left, least significant bit (LSB) to most significant bit (MSB). Address word, bit 4 corresponds to cross-compiler variable INPUT$DLY1; address word, bit 0 is INPUT; data word, bit 4 is the new INPUT$DLY1; data word, bit 1 is INPUT$DLY2; and data word, bit 0 is PE0_OUT2. As an example of reading this table consider three consecutive bits of an input stream to be 011, where 0 is the first bit received. In this example at time $T_n$, after the state processor has received the first two bits, INPUT=1, INPUT$DLY1=0. Thus the address into the RAM of PE0 is xxxx xxx0 xxx1. The data addressed at each of those locations is 0000 0001 0001. Thus, at time $T_{n+1}$, INPUT$DLY1=1, INPUT$DLY2=0, and PE0_OUT2=1, the exclusive-OR of INPUT and INPUT$DLY1. The RAM address into PE0 at time $T_{n+1}$ is xxxx xxx1 xxx1.

Figure 13:
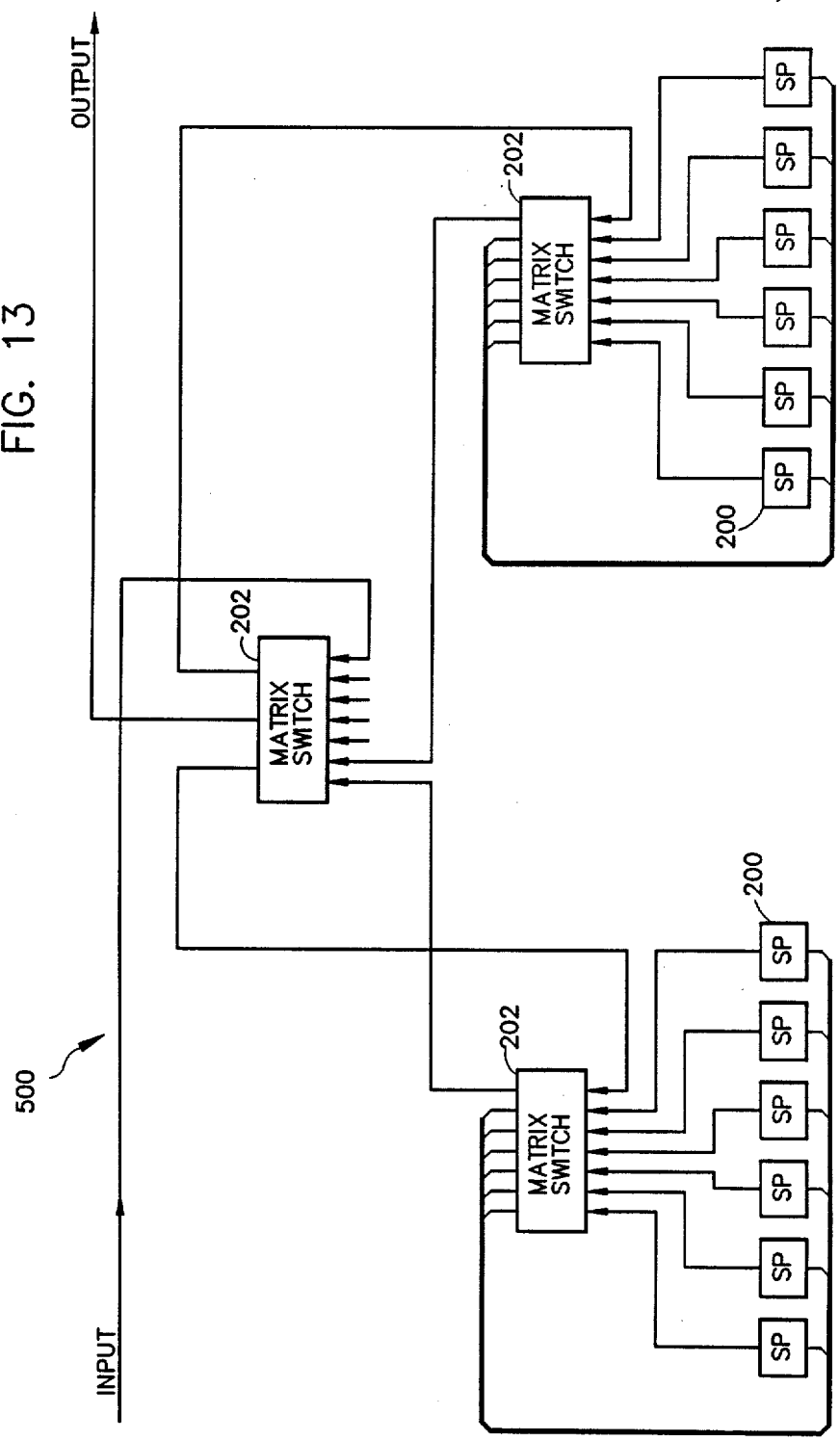
FIG. 13 is a block diagram of a three level hierarchical network of state processors (SPs) and matrix switches.

Turning now to FIG. 13, it can be seen that the multiple state processors 200 can be configured into a hierarchical network 500. The hierarchical alternative is desirable because a state processor 200 having too many programmable elements 100 would require a matrix switch 202 of unacceptable size. For instance, a non-blocking switch to accommodate 9 programmable elements 100 with 4 switch feedback inputs 214 per programmable element 100 and 4 state processor inputs 210 would require 40×40 or 1600 interconnects. At some point the real estate of a chip or the propagation delay of a switch 202 forces one to limit the number of programmable elements 100 in a state processor 200. The hierarchical, or tree, network 500 shown is useful when the input data can be hierarchically decomposed. The hierarchical network 500 is similar to the telephone system where closely related functions are proximate and share a common switch akin to a private branch exchange (PBX) of the telephone system.

The switching hierarchy 500 shown is in the shape of an inverted tree of three tiers. In this example, the first, or lowest switching tier 502, switching is performed inside the state processors 200. At the second tier, two matrix switches 202 are each responsible for routing the inputs and outputs of 6 state processors 200. At the third, or highest, tier, the matrix switch 202 is responsible for the 6 matrix switches 202 (only two shown) at level two. Thus, any programmable element 100 in the hierarchical network 500 may contribute its outputs 114 to the inputs 110 of any other programmable element 100. However, delay is increased as the distance between programmable elements 100 increases horizontally since a consequent vertical delay in switching is realized.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

TABLE 1

Descrambler HDL Source Code

```
1    ! DSCRAMS.SPL -- SINGLE COUNTER DESCRAMBLER - 6 PE
     VERSION - 6
2    !
3    BIND           0
4    EXTERNAL       INPUT
5    LOCAL          INPUT$DLY1
6    GLOBAL         PE0_OUT2
7    GLOBAL         INPUT$DLY2
8    !
9    INPUT$DLY1     := INPUT
10   INPUT$DLY2     := INPUT$DLY1
11   PE0_OUT2       := XOR ( INPUT , INPUT$DLY1 )
12   !
13   BIND           1
14   GLOBAL INPUT$DLY3
15   !
16   INPUT$DLY3     := INPUT$DLY2
17   !
18   BIND           2
19   LOCAL          INPUT$DLY4
20   GLOBAL         INPUT$DLY5
21   GLOBAL         PE2_OUT2
22   !
23   INPUT$DLY4     := INPUT$DLY3
24   INPUT$DLY5     := INPUT$DLY4
25   PE2_OUT2       := XOR ( INPUT$DLY3 , INPUT$DLY4 )
26   !
27   BIND           3
28   GLOBAL         INPUT$DLY6
29   GLOBAL         INPUT$DLY7
30   !
31   INPUT$DLY6     := INPUT$DLY5
32   INPUT$DLY7     := INPUT$DLY6
33   !
34   BIND           4
35   LOCAL          INPUT$DLY8
36   INTERMEDIATE   XOR1
37   INTERMEDIATE   XOR2
38   LOCAL          COUNT_RESET
39   LOCAL          COUNT_VALUE(4)
40   GLOBAL         COUNT_EQ_8
41   !
42   INPUT$DLY8     := INPUT$DLY7
43   XOR1           = XOR ( INPUT , INPUT$DLY8 )
44   XOR2           = XOR ( INPUT , INPUT$DLY7 )
45   COUNT_RESET    := AND (XOR1, XOR2)
46   IF COUNT_RESET
47      COUNT_VALUE    := 0
48      COUNT_EQ_8     := 0
49   ELSE
50   NORMAL COUNTER FUNCTION
51      COUNT_VALUE    := COUNT_VALUE + 1
52      COUNT_EQ_8     := 0
53   ! SPECIAL CASE WILL TAKE PRECEDENCE.
54      IF COUNT_VALUE .EQ. 8
55         COUNT_VALUE : 0
56      ENDIF
57      IF COUNT_VALUE .EQ. 7
58         COUNT_EQ_8 := 1
59      ENDIF
60   ENDIF
61   !
62   BIND 5
```

TABLE 1-continued

Descrambler HDL Source Code

| | | |
|---|---|---|
| 63 | EXTERNAL OUTPUT1 | |
| 64 | OUTPUT1 | := XOR ( PE0_OUT2 , PE2_OUT2 , INPUTSDLY6, COUNT_EQ_8 ) |

TABLE 2

PE0 Memory Load

P = Present State (INPUTSDLY1)
I = PE Input (INPUT)
N = Next State (INPUTSDLY1)
O = PE Output 1 (INPUTSDLY2)
Q = PE Output 2 (PE0_OUT2)
X = Don't Care

| Address | | | Data | | |
|---|---|---|---|---|---|
| | P | I | | N | OQ |
| xxxx | xxx0 | xxx0 | 0000 | 0000 | 0000 |
| xxxx | xxx0 | xxx1 | 0000 | 0001 | 0001 |
| xxxx | xxx1 | xxx0 | 0000 | 0000 | 0011 |
| xxxx | xxx1 | xxx1 | 0000 | 0001 | 0010 |

I claim:

1. A programmable element to provide a programmable state machine, comprising:
   a run address register having a set of run address register inputs, a set of run address register outputs and a clock input, said run address register responsive to a clock signal on said clock input to transfer data from said set of run address register inputs to said set of run address register outputs;
   a random access read/write memory (RAM) having a set of RAM address inputs, a set of RAM data inputs and a set of RAM data outputs, said RAM responsive to an address on said set of RAM address inputs to provide a plurality of RAM data bits on said set of RAM data outputs stored at a location address defined by said address;
   a selector that connects said set of run address register outputs to said set of RAM address inputs;
   at least one programmable element input line from a source to at least one external to said programmable element input of said set of run address register inputs to provide an external data input to said run address register;
   at least one internal programmable element feedback line from said set of RAM data outputs to at least one input of said set of run address register inputs to provide at least one bit of said plurality of RAM data bits on said set of RAM data outputs as an input bit to one of said run address register inputs; and
   at least one programmable element output line from one output of said set of RAM data outputs to provide an external connection to at least one output of said set of RAM data outputs.

2. A programmable element as defined in claim 1, further comprising at least one external programmable element feedback line from at least one of said set of RAM data outputs to an intermediate destination external to said programmable element, said intermediate destination operating as a source to said run address register inputs.

3. A programmable element as defined in claim 1, further comprising a load address register having a set of load address register inputs connected to an external source and a set of load address register outputs, said load address register outputs connected to said set of RAM address inputs via said selector, said selector operating to select one of said set of load address register outputs and said set of run address register outputs as the set of RAM address inputs.

4. A programmable element as defined in claim 3, wherein said selector is wire-OR connection between said set of run address register outputs and said set of load address register outputs.

5. A state processor comprising:
   a plurality of programmable elements, each programmable element comprising:
   a run address register having a set of run address register inputs, a set of run address register outputs and a clock input, said run address register responsive to a clock signal on said clock input to transfer data from said set of run address register inputs to said set of run address register outputs;
   a random access read/write memory (RAM) having a set of RAM address inputs, a set of RAM data inputs and a set of RAM data outputs, said RAM responsive to an address on said set of RAM address inputs to provide a plurality of RAM data bits on said set of RAM data outputs stored at a location address defined by said address;
   a selector that connects said set of run address register outputs to said set of RAM address inputs;
   at least one programmable element input line from a source external to said programmable element to at least one input of said set of run address register inputs to provide an external data input to said run address register;
   at least one internal programmable element feedback line from said set of RAM data outputs to at least one input of said set of run address register inputs to provide at least one bit of said plurality of RAM data bits on said set of RAM data outputs as an input bit to one of said run address register inputs; and
   at least one programmable element output line from one output of said set of RAM data outputs to provide an external connection to at least one output of said set of RAM data outputs; and
   a switch having a set of switch inputs and a set of switch outputs, said switch inputs connected to said at least one programmable element output line and to at least one external input connection, said switch outputs connected to said at least one programmable element input line and to at least one external output connection, said switch further including means for selecting which ones of said switch inputs are connected to which ones of said switch outputs.

6. A state processor as defined in claim 5, wherein said switch is a non-blocking matrix switch.

7. A state processor as defined in claim 5, wherein said switch is a wire-OR matrix switch.

8. A state processor as defined in claim 5, wherein said switch is a multi-level memory matrix switch.

9. A state processor as defined in claim 5, wherein said switch is an optical switch having a plurality of optical inputs responsive to said at least one programmable element output and a plurality of optical outputs coupled to said at least one programmable element input, said optical outputs being selectively coupled to said optical inputs.

10. A state processor as defined in claim 9, wherein said switch comprises a plurality of optical windows between said optical inputs and said optical outputs, said optical windows being selectively opaque to block light between said optical inputs and said optical outputs and selectively translucent to transmit light between said optical inputs and said optical outputs.

11. A network of state processors comprising:
 a plurality of state processors, each state processor comprising:
  a plurality of programmable elements, each programmable element comprising:
   a run address register having a set of run address register inputs, a set of run address register outputs and a clock input, said run address register responsive to a clock signal on said clock input to transfer data from said set of run address register inputs to said set of run address register outputs;
   a random access read/write memory (RAM) having a set of RAM address inputs, a set of RAM data inputs and a set of RAM data outputs, said RAM responsive to an address on said set of RAM address inputs to provide a plurality of RAM data bits on said set of RAM data outputs stored at a location address defined by said address;
   a selector that connects said set of run address register outputs to said set of RAM address inputs;
   at least one programmable element input line from a source external to said programmable element to at least one input of said set of run address register inputs to provide an external data input to said run address register;
   at least one external programmable element feedback line from said set of RAM data outputs to at least one input of said set of run address register inputs to provide at least one bit of said plurality of RAM data bits on said set of RAM data outputs as an input bit to one of said run address register inputs; and
   at least one programmable element output line from one output of said set of RAM data outputs to provide an external connection to at least one output of said set of RAM data outputs; and
  a switch having a set of switch inputs and a set of switch outputs, said switch inputs connected to said at least one programmable element output line and to at least one external input connection, said switch outputs connected to said at least one programmable element input line and to at least one external output connection, said switch further including means for selecting which ones of said switch inputs are connected to which ones of said switch outputs; and
 at least one non-blocking matrix switch connecting selected ones of said at least one external output connection of each of said state processors to selected ones of said at least one external input connection of each of said state processors.

12. A network of state processors as defined in claim 11, wherein said network is a hierarchical network organized in the shape of an inverted tree having a plurality of tiers including a lowest tier, said network comprising:
 a plurality of said state processors located at the lowest tier;
 a plurality of said non-blocking matrix switches located at all other tiers; and
 a plurality of connections between said state processors and said switches to route selected ones of said state processor external output connections to selected ones of said state processor external input connections.

13. A network of state processors as defined in claim 11, wherein said network comprises:
 a plurality of said non-blocking matrix switches organized in an inverted tree structure having a plurality of tiers of gradually increasing numbers of said matrix switches at each tier lower than the previous tier beginning at a top-most tier wherein the top-most tier is defined by one of said matrix switches connected to said external input connections and said external output connections; and
 a plurality of connections between said state processors and said matrix switches to route selected ones of said external output connections to selected ones of said external input connections so that said state processors are joined to said inverted tree at a bottom-most tier.

* * * * *